United States Patent
Zhu et al.

(10) Patent No.: US 11,606,762 B2
(45) Date of Patent: Mar. 14, 2023

(54) SYNCHRONIZATION SIGNAL BLOCK-LEVEL SLEEP MODE

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/932,412

(22) Filed: Jul. 17, 2020

(65) Prior Publication Data

US 2022/0022144 A1    Jan. 20, 2022

(51) Int. Cl.
*H04W 56/00* (2009.01)
*H04W 24/10* (2009.01)
*H04B 7/06* (2006.01)
*H04B 7/01* (2006.01)
*H04W 72/044* (2023.01)

(52) U.S. Cl.
CPC .......... *H04W 56/001* (2013.01); *H04B 7/01* (2013.01); *H04B 7/0617* (2013.01); *H04W 24/10* (2013.01); *H04W 72/046* (2013.01)

(58) Field of Classification Search
CPC . H04W 56/001; H04W 24/10; H04W 72/046; H04B 7/01; H04B 7/0617
See application file for complete search history.

(56) References Cited

U.S. PATENT DOCUMENTS

| | | | |
|---|---|---|---|
| 6,470,192 B1 * | 10/2002 | Karlsson | H01Q 1/246 455/25 |
| 11,291,012 B2 * | 3/2022 | Shih | H04B 7/0404 |
| 2019/0394662 A1 * | 12/2019 | Josan | H04W 24/10 |
| 2020/0107235 A1 * | 4/2020 | Peisa | H04W 74/02 |
| 2020/0358515 A1 * | 11/2020 | Li | H04B 7/0695 |
| 2021/0068193 A1 * | 3/2021 | Kong | H04W 52/0229 |
| 2021/0329546 A1 * | 10/2021 | Wang | H04W 76/15 |
| 2021/0392525 A1 * | 12/2021 | Kaikkonen | H04B 7/0695 |

FOREIGN PATENT DOCUMENTS

| | | | | |
|---|---|---|---|---|
| WO | WO-2020004961 A1 * | 1/2020 | | |
| WO | WO-2020152803 A1 * | 7/2020 | | H04B 17/309 |
| WO | WO-2021115568 A1 * | 6/2021 | | H04W 68/00 |

* cited by examiner

*Primary Examiner* — Deepa Belur
(74) *Attorney, Agent, or Firm* — Changwoo Yang

(57) ABSTRACT

Certain aspects of the present disclosure provide techniques for a synchronization signal block (SSB)-level sleep mode. A method that may be performed by a user equipment (UE) includes determining, from a synchronization signal burst set, a first set of synchronization signal blocks (SSBs) to forgo performing measurements on using one or more receive beams based, at least in part, on one or more previous measurements associated with the determined first set of SSBs and performing measurements on only one or more remaining SSBs in the synchronization signal burst set using the one or more receive beams.

30 Claims, 9 Drawing Sheets

SYNCHRONIZATION SIGNAL BLOCK-LEVEL SLEEP MODE

INTRODUCTION

Field of the Disclosure

Aspects of the present disclosure relate to wireless communications, and more particularly, to techniques for a synchronization signal block (SSB)-level sleep mode.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include a synchronization signal block (SSB)-level sleep mode.

Certain aspects of the subject matter described in this disclosure can be implemented in a method for wireless communication in a wireless network by a user equipment (UE). The method generally includes determining, from a synchronization signal burst set, a first set of synchronization signal blocks (SSBs) to forgo performing measurements on using one or more receive beams based, at least in part, on one or more previous measurements associated with the determined first set of SSBs and performing measurements on only one or more remaining SSBs in the synchronization signal burst set using the one or more receive beams.

Certain aspects of the subject matter described in this disclosure can be implemented in an apparatus for wireless communication in a wireless network by a user equipment (UE). The apparatus generally includes at least one processor configured to: determine, from a synchronization signal burst set, a first set of synchronization signal blocks (SSBs) to forgo performing measurements on using one or more receive beams based, at least in part, on one or more previous measurements associated with the determined first set of SSBs and perform measurements on only one or more remaining SSBs in the synchronization signal burst set using the one or more receive beams. The apparatus also generally includes a memory coupled with the at least one processor.

Certain aspects of the subject matter described in this disclosure can be implemented in an apparatus for wireless communication in a wireless network by a user equipment (UE). The apparatus generally includes means for determining, from a synchronization signal burst set, a first set of synchronization signal blocks (SSBs) to forgo performing measurements on using one or more receive beams based, at least in part, on one or more previous measurements associated with the determined first set of SSBs and means for performing measurements on only one or more remaining SSBs in the synchronization signal burst set using the one or more receive beams.

Certain aspects of the subject matter described in this disclosure can be implemented in a non-transitory computer-readable medium for wireless communication in a wireless network by a user equipment (UE). The non-transitory computer-readable medium generally includes instructions that, when executed by at least one processor, cause at least one processor to: determine, from a synchronization signal burst set, a first set of synchronization signal blocks (SSBs) to forgo performing measurements on using one or more receive beams based, at least in part, on one or more previous measurements associated with the determined first set of SSBs and perform measurements on only one or more remaining SSBs in the synchronization signal burst set using the one or more receive beams.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
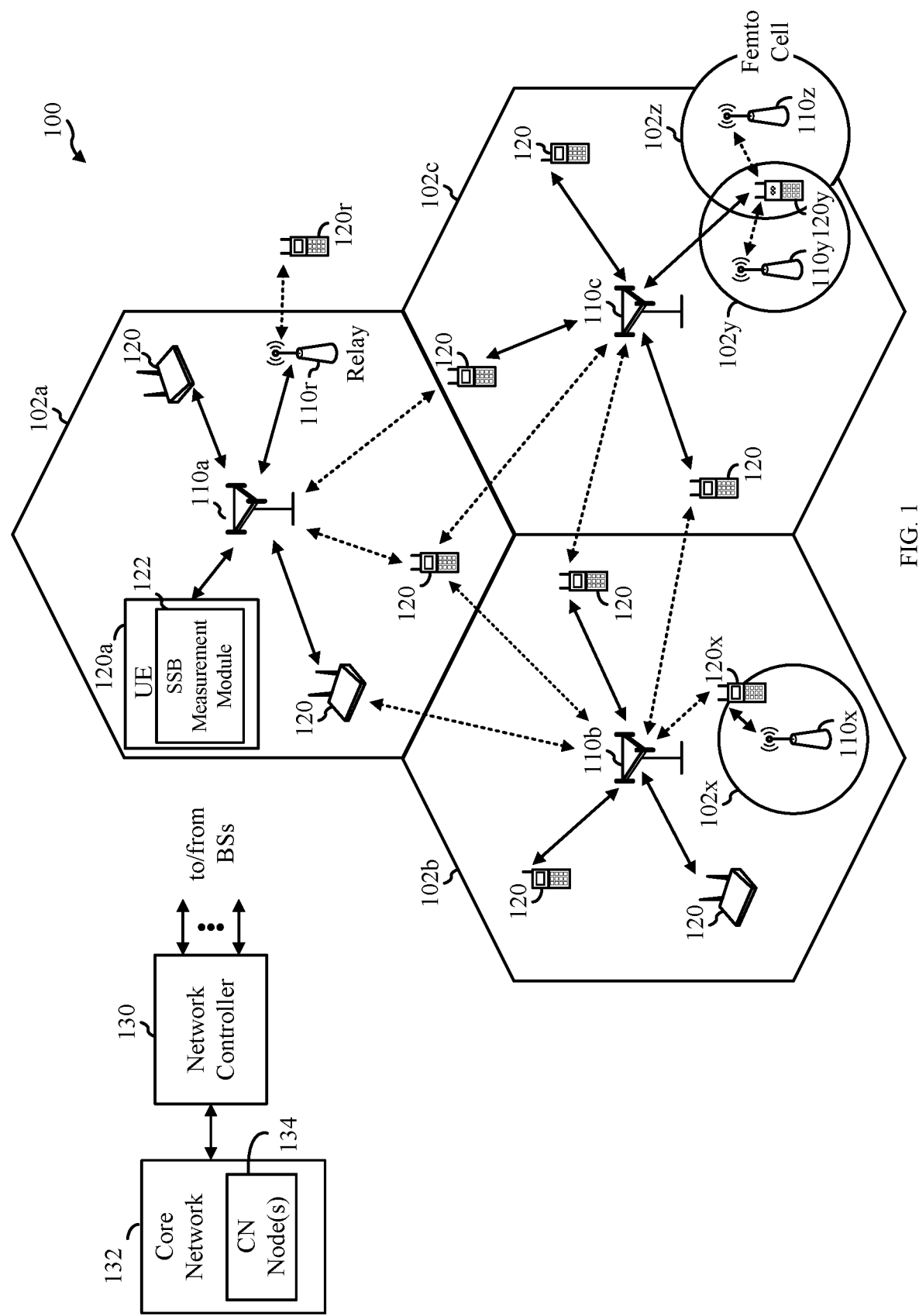
FIG. 1 is a block diagram conceptually illustrating an example telecommunications system, in accordance with certain aspects of the present disclosure.

Aspects of the present disclosure provide apparatus, methods, processing systems, and computer readable mediums for a synchronization signal block (SSB)-level sleep mode. For example, in certain communication systems, such as a 5G millimeter wave (mmW) communication system, the UE may need to efficiently search and track the best transmit (Tx)-receive (Rx) beams in a time-varying wireless channel. The UE may search and track these Tx-Rx beams based on SSBs transmitted by a base station. For example, in some cases, the UE may perform measurements on the SSBs transmitted by the base station to determine a best Tx-Rx beam pair for communication. However, because mmW channels are not typically richly scattered, weak gain may be observed by the UE on many Tx-Rx beam pairs when measuring certain SSBs. Thus, tracking Tx-Rx beam pairs associated with every SSB transmitted by the base station may be inefficient and lead to wasted resources at the UE.

Accordingly, aspects of the present disclosure provide techniques for reducing power consumption and the wasting of processing resources associated with tracking Tx-Rx beam pairs. For example, in some cases, aspects of the present disclosure provide techniques for a synchronization signal block (SSB)-level sleep mode whereby the UE may determine a set of SSBs of a synchronization signal burst set to ignore when performing beam measurements, allowing the UE to conserve power by putting all of its RF chains (e.g., used to perform the measurements) into a sleep mode (e.g., powering down) during transmission of this set of SSBs.

The following description provides examples of an SSB-level sleep mode in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for NR PDCCH repetition. As shown in FIG. 1, the UE 120a includes a synchronization signal block (SSB) measurement module 122. The SSB measurement module 122 may be configured to perform the operations illustrated in one or more of FIG. 7, as well as other operations disclosed herein for an SSB-level sleep mode, in accordance with aspects of the present disclosure.

Figure 2:
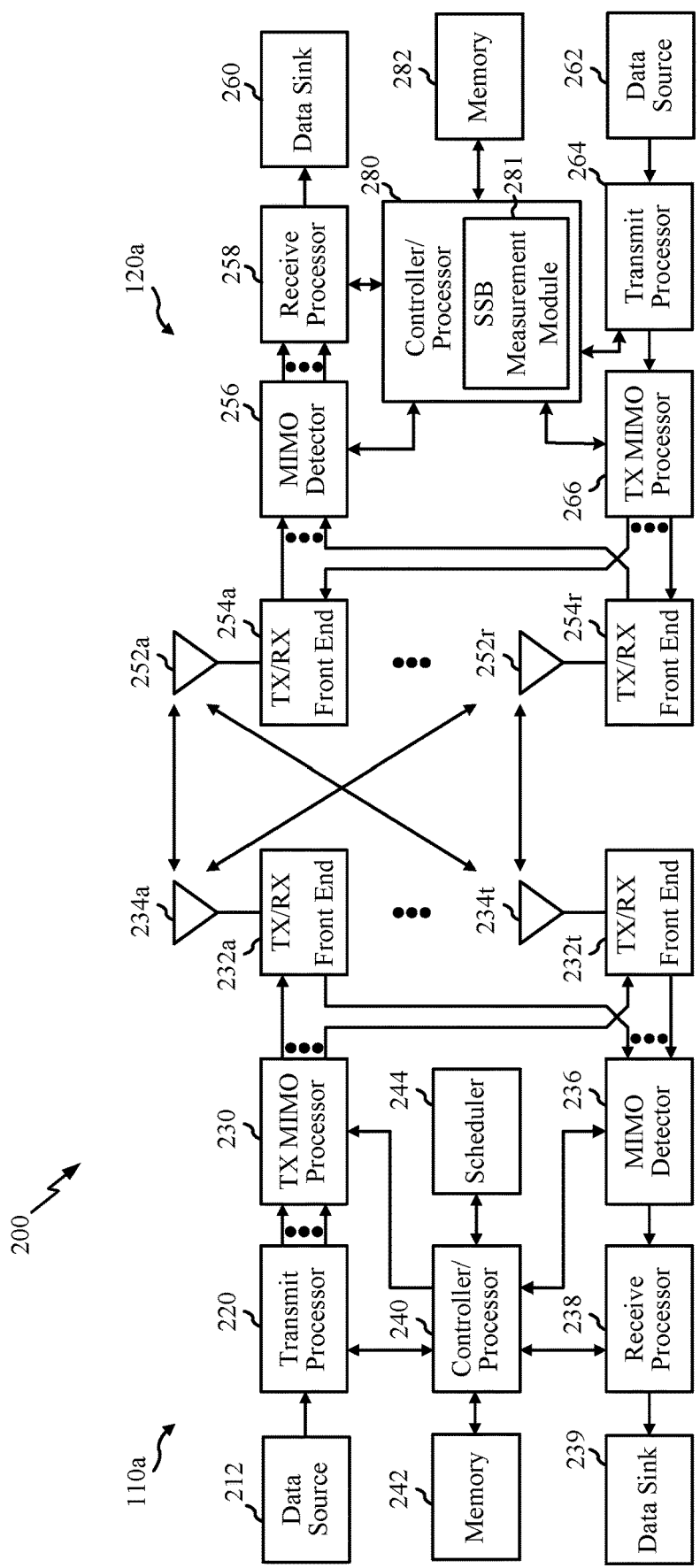
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the transmit (TX) front-end circuits 232a through 232t. Each TX front-end circuit 232 may process a respective output symbol stream (e.g., for OFDM, etc.) to obtain an output sample stream. Each TX front-end circuit may further process (e.g., convert to analog, amplify, filter, and upconvert) the output sample stream to obtain a downlink signal. Downlink signals from TX front-end circuits 232a through 232t may be transmitted via the antennas 234a through 234t, respectively.

At the UE 120a, the antennas 252a-252r may receive the downlink signals from the BS 110a and may provide received signals to the receive (RX) front-end circuits 254a through 254r, respectively. Each RX front-end circuit 254 may condition (e.g., filter, amplify, downconvert, and digitize) a respective received signal to obtain input samples. Each RX front-end circuit may further process the input samples (e.g., for OFDM, etc.) to obtain received symbols. A MIMO detector 256 may obtain received symbols from all the RX front-end circuits 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the RX front-end circuits 254a through 254r (e.g., for SC-FDM, etc.), and transmitted to the BS 110a. At the BS 110a, the uplink signals from the UE 120a may be received by the antennas 234, processed by the TX front-end circuits 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink. In certain aspects, the TX/RX front-end circuits 232, 254 may include a tuning circuit for adjusting a source impedance seen by a portion of a receive path, as further described herein.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a includes a synchronization signal block (SSB) measurement module 281 that may be configured to perform the operations illustrated in FIG. 7, as well as other operations described herein for SSB-level sleep mode, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz, and other SCS may be defined with respect to the base SCS (e.g., 30 kHz, 60 kHz, 120 kHz, 240 kHz, etc.).

Figure 3:
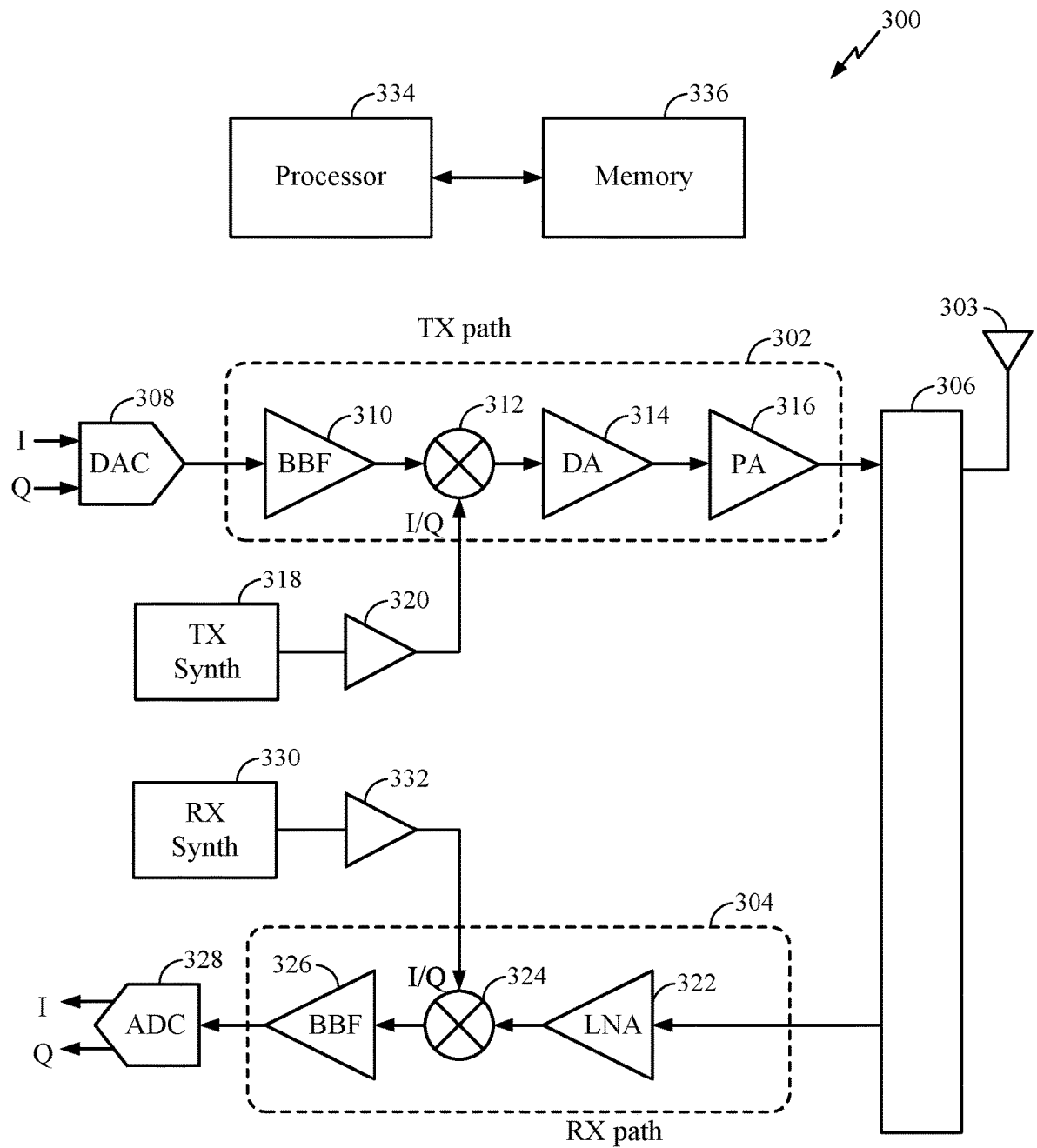
FIG. 3 is a block diagram showing an example transceiver front-end, in accordance with certain aspects of the present disclosure.

FIG. 3 is a block diagram of an example transceiver front-end 300, such as TX/RX front-end circuits 232, 254 in FIG. 2, in accordance with certain aspects of the present disclosure. The transceiver front-end 300 includes at least one transmit (TX) path 302 (also known as a transmit chain or radio frequency (RF) chain) for transmitting signals via one or more antennas and at least one receive (RX) path 304 (also known as a receive chain or RF chain) for receiving signals via the antennas. When the TX path 302 and the RX path 304 share an antenna 303, the paths may be connected with the antenna via an RF interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be included in the RFIC or external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 may include a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies may indicate using a variable-frequency oscillator, which can involve compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324.

Figure 4:
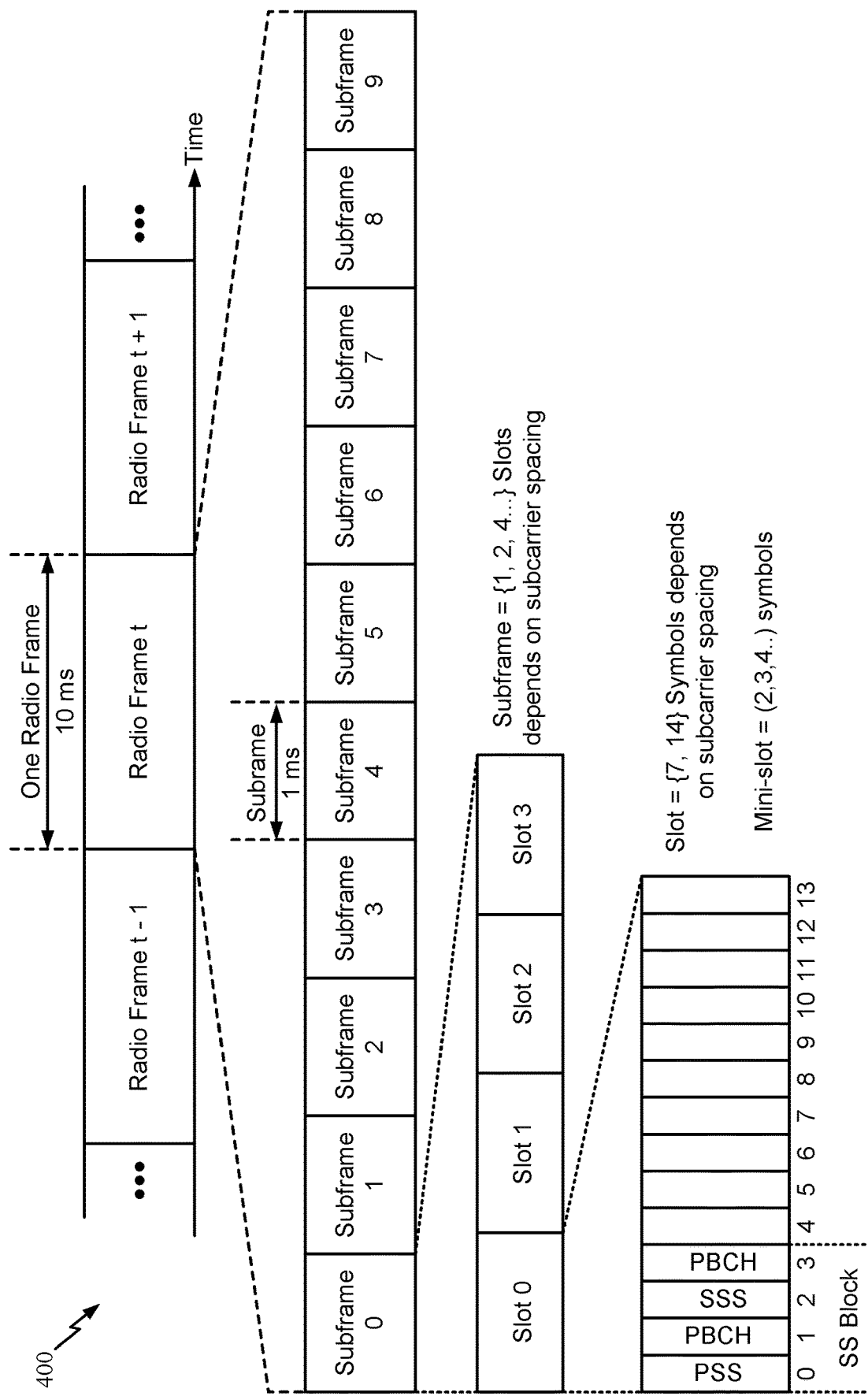
FIG. 4 is an example frame format for new radio (NR), in accordance with certain aspects of the present disclosure.

FIG. 4 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 5:
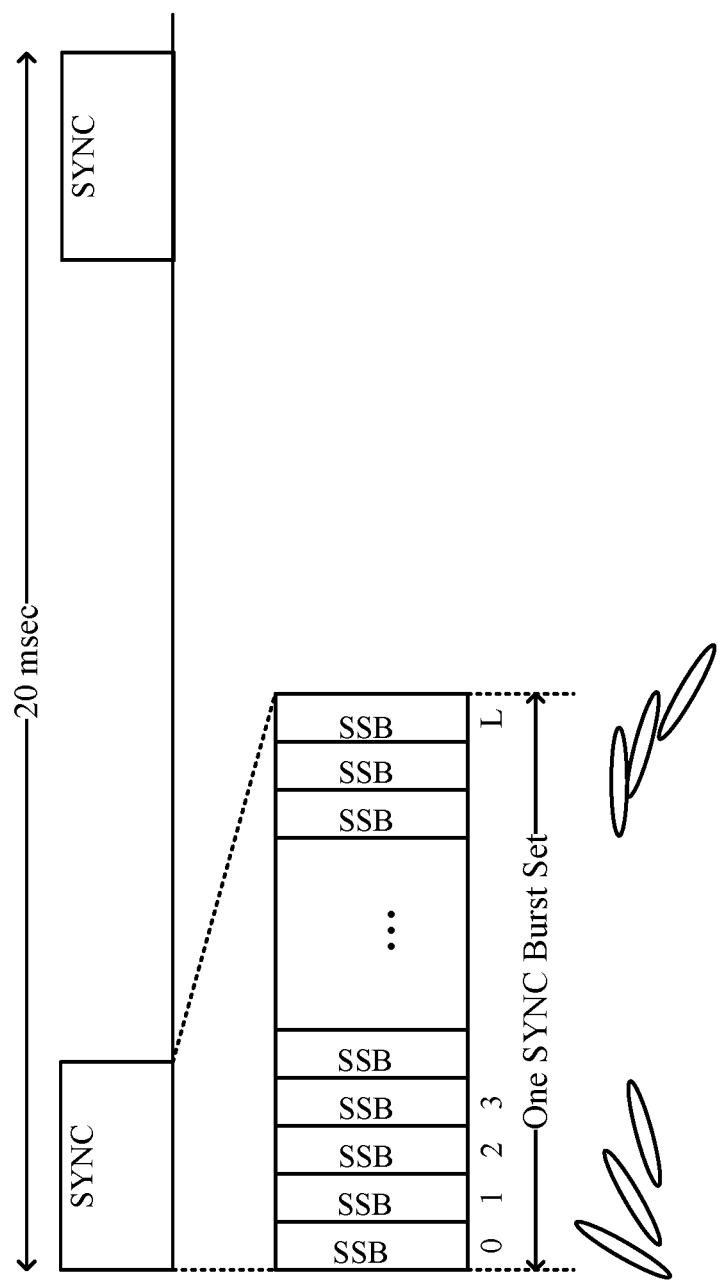
FIG. 5 illustrates how different synchronization signal blocks (SSBs) may be sent using different beams, in accordance with certain aspects of the present disclosure.

As shown in FIG. 5, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Example Beam Refinement Procedures

In certain multi-beam systems (e.g., millimeter wave (mmW) cellular systems), beam forming may be needed to overcome high path-losses. As described herein, beamforming may refer to establishing a link between a BS and UE, wherein both of the devices form a beam corresponding to each other. Both the BS and the UE find at least one adequate beam to form a communication link. A BS-beam and a UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPs) or as fallback BPLs in case an existing BPL fails.

The UE typically monitors the quality of a BPL and the network may refine a BPL from time to time.

Figure 6:
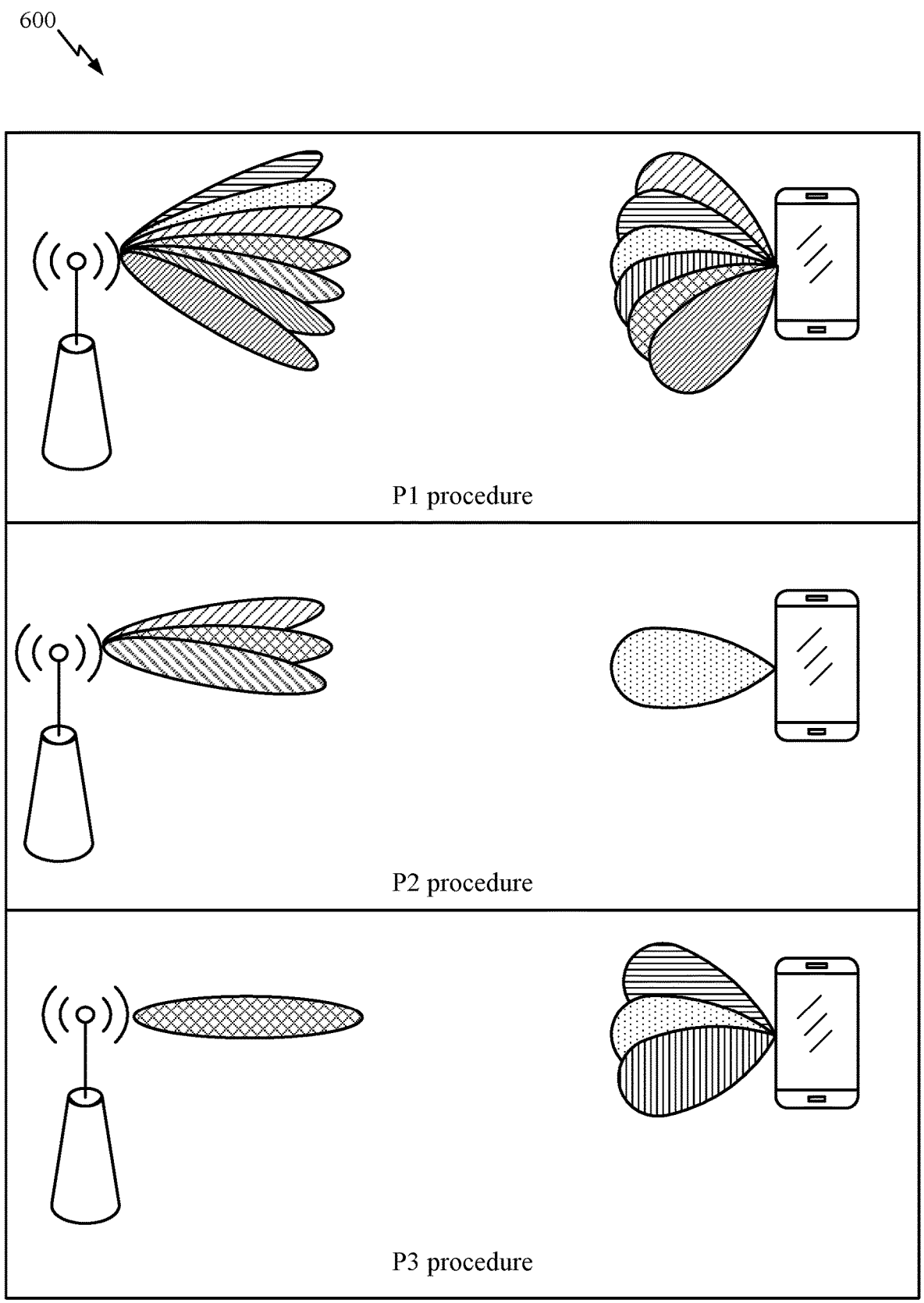
FIG. 6 illustrates example beam refinement procedures, in accordance with certain aspects of the present disclosure

FIG. 6 illustrates example 600 for BPL discovery and refinement. In 5G-NR, the P1, P2, and P3 procedures may be used for BPL discovery and refinement. The BS may use a P1 procedure to enable the discovery of new BPLs. In the P1 procedure, as illustrated in FIG. 6, the BS transmits reference signals (e.g., channel state information reference signals (CSI-RS) and/or synchronization signal block (SSBs)), where each of the reference signals are beam formed in a different spatial direction such that several (most, all) relevant places of the cell are reached. Stated otherwise, the BS transmits reference signals using different transmit beams over time and in different directions.

For successful reception of at least a symbol of this "P1-signal", the UE has to find an appropriate receive beam. It searches using available receive beams and applying a different UE-beam during each occurrence of the periodic or aperiodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 6). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 6). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Example Synchronization Signal Block-Level Sleep Mode

As discussed above, in 5G NR communication, such as millimeter wave (mmW) communication, the UE may need to efficiently search and track the best transmit (Tx)-receive (Rx) beams in a time-varying wireless channel. Accordingly, an efficient search and track algorithm is important so that the best Tx-Rx beam pair between the BS and UE can be found and acquired as quickly as possible, allowing the UE to access the network promptly. Additionally, such algorithm is important as the UE may also need to efficiently track the changes in beam direction and quality as often as possible due to continually changing channel conditions.

However, searching and tracking beams may consume a significant amount of power. For example, in 5G NR, mmW radio frequency (RF) communications (e.g., active phasers) may consume up to 75% of the overall power of a UE as compared to 30% in long term evolution (LTE). Moreover, mmW channels are not typically richly scattered and, thus, weak gain may be observed by the UE on many Tx-Rx beam pairs. Thus, tracking every Tx-Rx beam pair may be inefficient and lead to wasted resources at the UE (e.g., power resources and processing resources).

Accordingly, aspects of the present disclosure provide techniques for reducing power consumption and the wasting of processing resources associated with tracking Tx-Rx beam pairs. For example, in some cases, aspects of the present disclosure provide techniques for a synchronization signal block (SSB)-level sleep mode whereby the UE may determine a set of SSBs of a synchronization signal burst set to ignore when performing beam measurements, allowing the UE to conserve power by putting all of its RF chains (e.g., used to perform the measurements) into a sleep mode (e.g., powering down) during transmission of this set of SSBs.

Additionally, in some cases, such techniques may also allow the UE to selectively put a set of RF chains into the sleep mode (e.g., powering down) while the UE performs measurements on a remaining set of SSBs of the synchronization signal burst set. For example, in some cases, the set of RF chains may be associated with receive beams having a power value measurement below a particular threshold and, thus, the UE may conserve power by not having to perform measurements on these receive beams which are likely associated with poor channel conditions.

Figure 7:
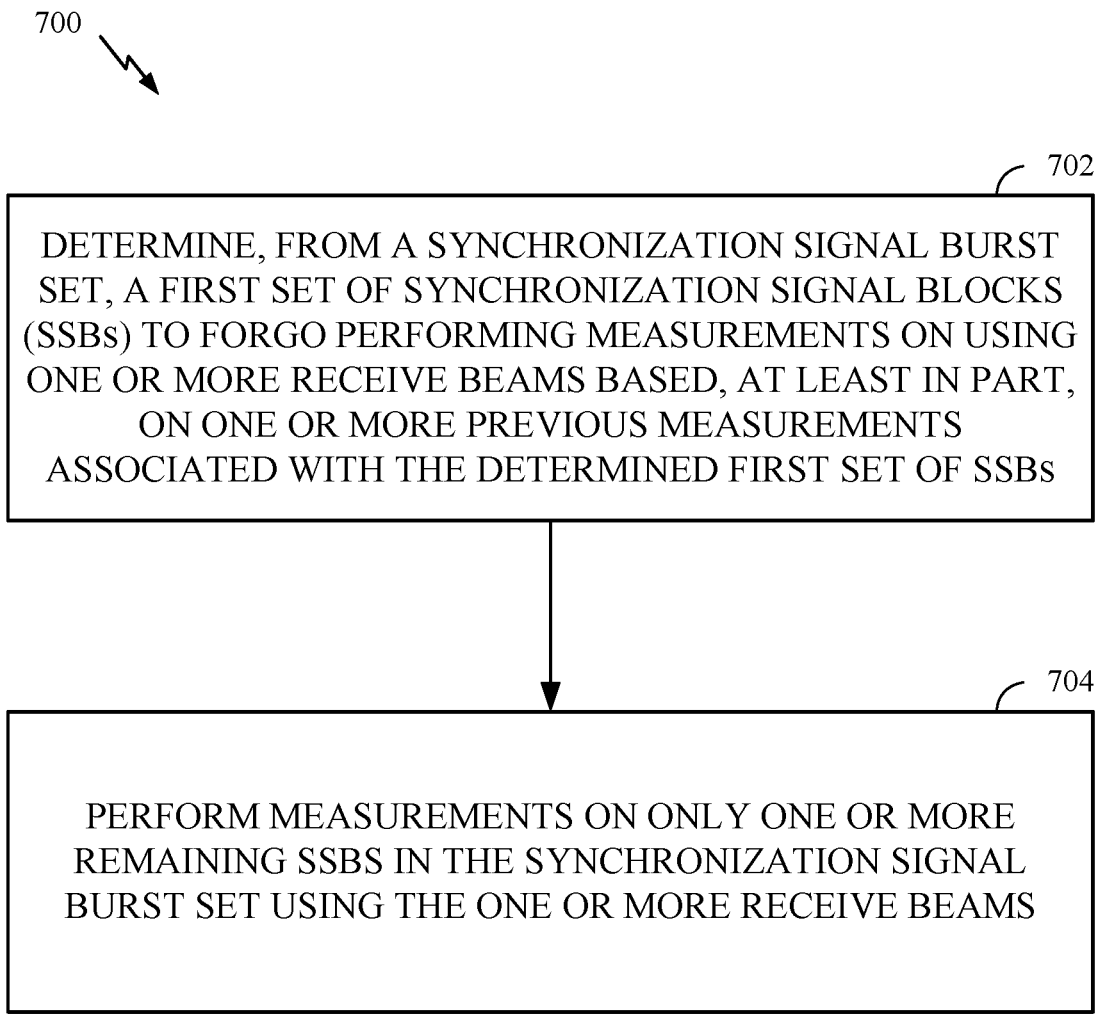
FIG. 7 is a flow diagram illustrating example operations for wireless communication by a UE in a wireless network, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, by determining, from a synchronization signal burst set, a first set of synchronization signal blocks (SSBs) to forgo performing measurements on using one or more receive beams based, at least in part, on one or more previous measurements associated with the determined first set of SSBs.

At 704, the UE performs the measurements on only one or more remaining SSBs in the synchronization signal burst set using the one or more receive beams.

Figure 8:
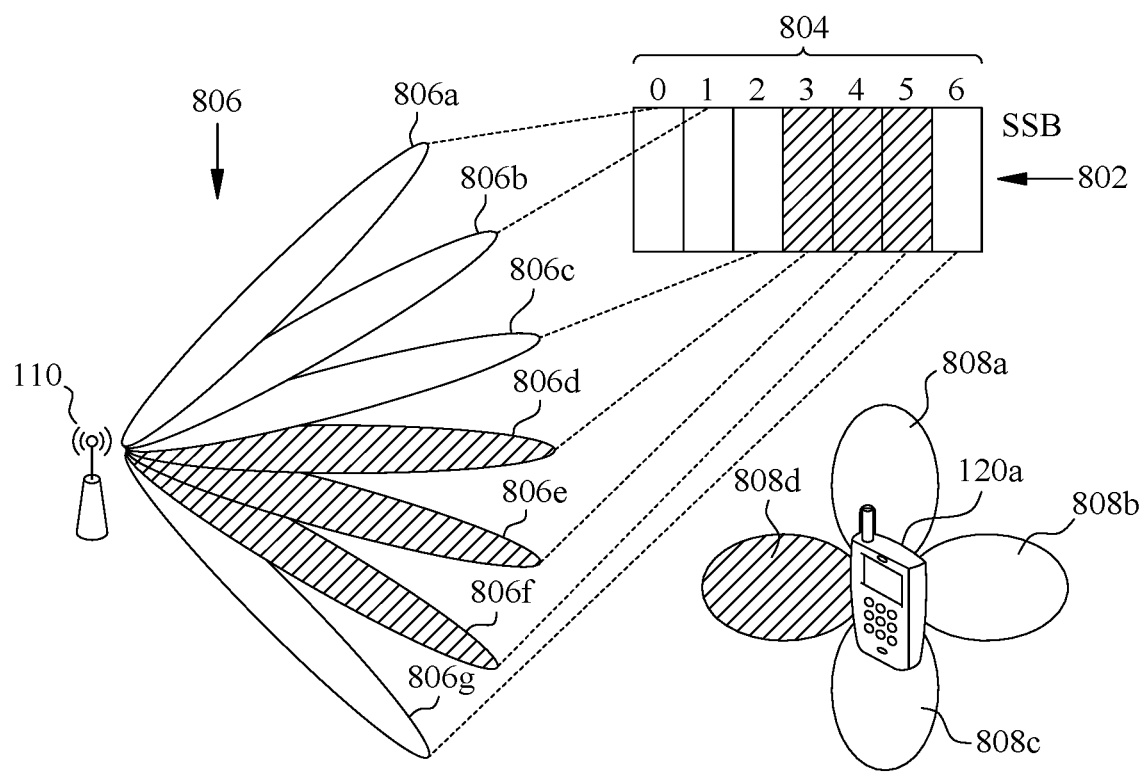
FIG. 8 illustrates techniques for selecting a set of synchronization signal blocks to forego performing measurements on, in accordance with certain aspects of the present disclosure.

As shown in FIG. 8, there may be up to L SSBs 802 (e.g., seven SSBs are illustrated in FIG. 8) in each synchronization signal burst set 804 (e.g., having a periodicity of 20 ms) and each SSB may be associated with a different BS Tx-beam 806. Traditionally, the UE 120a would perform measurements for each SSB of a synchronization signal burst set to determine a best Tx-Rx beam pair. In some cases, the UE may perform such measurements using one or more Rx beams 808a-d associated with different radio frequency (RF) chains of the UE (e.g., Rx path 304). In many cases, however, all Rx beams associated with certain SSBs (e.g., BS Tx-beams) of the synchronization signal burst set may have weak gain, leading to wasted power and processing resources if the UE has to perform measurements associated with these SSBs.

For example, as illustrated in FIG. 8, SSB 0 may be associated with the BS Tx-beam 806a, which, as shown, may be transmitted by the base station 110 in a spatial direction away from the UE 120a. Accordingly, because the BS Tx-beam 806a is transmitted in a spatial direction away from the UE 120a, power measurements performed by the UE 120 on SSB 0 for each of the UE Rx-beams 808a-d may have weak gain (e.g., a power value below a threshold). Thus, in such cases, the UE may waste power and processing resources by performing the measurements on the SSB 802a.

Accordingly, to help reduce power consumption and wasted processing resources at the UE, instead of performing measurements for every SSB of the synchronization signal burst set, the UE may determine one or more sets of SSBs of a synchronization signal burst set to forgo performing measurements on, allowing the UE to power down one or more of its RF chains during transmission of the one or more sets of SSBs, thereby conserving power and processing resources. The UE may then instead perform the measurements only on one or more remaining SSBs of the synchronization signal burst set.

For example, with reference to FIG. 8, in some cases, the UE 120a may determine a first set of SSBs of the synchronization signal burst set 804, such as the SSBs 0, 1, 2, and 6 (e.g., associated with BS Tx-beams 806a-c and 806g), to forgo performing measurements using the UE Rx-beams 808a-d. In some cases, the UE 120a may determine the first set of SSBs based, at least in part, on one or more previous measurements associated with the determined first set of SSBs. For example, in some cases, the UE 120a may determine, based on the one or more previous measurements, that each receive beam of the one or more receive beams (e.g., 808a-d) used to perform the one or more previous measurements on the first set of SSBs (e.g., SSBs 0, 1, 2, and 6) has a power value measurement that is below a threshold power value, indicating that these receive beams do not provide significant gain and, therefore, would not be suitable for communicating with the BS 110. In some cases, the one or more previous measurements may filtered based on one or more filtering parameters.

Accordingly, in this case, the UE 120a may select the first set of SSBs based on each receive beam of the one or more receive beams used to perform the one or more previous measurements on the first set of SSBs having the power value measurement that is below the threshold power value. In other words, the UE 120a may select the SSBs of the synchronization signal burst set 804 where all of the receive beams used to measure these SSBs have a power value measurement that is below the threshold power value.

In some cases, the power threshold value may be based on one or more channel statistics associated with the one or more receive beams. For example, in some cases, the one or more channel statistics comprise at least one of whether the one or more receive beams are in line of sight (LOS), whether the one or more receive beams are in non-line of sight (NLOS), or rich scattering associated with the one or more receive beams. Additionally, in some cases, the power threshold value may also be based on at least one of a rotation speed of the UE or a Doppler measurement associated with the UE.

Thereafter, the UE may perform the measurements on only one or more remaining SSBs in the synchronization signal burst set using the one or more receive beams. In some cases, the one or more remaining SSBs may include SSBs where at least one receive beam of the one or more receive beams used for performing the measurements on the one or more remaining SSBs has a previous power value measurement that is equal to or above the threshold power value. For example, as illustrated in FIG. 8, in some cases, based on previous measurements, the UE 120a may determine that SSBs 3, 4, and 5 (e.g., associated with BS Tx-beams 806d-f) are associated with at least one receive beam of the plurality of receive beams (e.g., 808a-808d) that has a power a previous power value measurement that is equal to or above the threshold power value, indicating that at least one of these beams may be suitable for communicating with the BS 110. Accordingly, the UE may then perform the measurements on only the one or more remaining SSBs (e.g., SSBs 3, 4, and 5) using the one or more receive beams (e.g., 808a-808d), excluding performance of the measurements on the first set of SSBs (e.g., SSBs 0, 1, 2, and 6).

Additionally, since the UE 120a may forego performing the measurements on the first set of SSBs, the UE may 120a may conserve power and processing resources powering down (e.g., putting into a sleep mode) a first set of radio frequency (RF) chains (e.g., Rx path 304) of the UE during transmission of the first set of SSBs by the BS 110. For example, since, based on previous measurements, no receive beams (e.g., 808a-808d) associated with the first set of SSBs are likely to have power value measurements equal to or above the threshold power value, the UE 120a, may decide to power down a first set of RF chains used for developing these receive beams during transmission of the first set of SSBs, thereby reducing the amount of processing needed to be performed by the UE 120a and, thus, conversing battery power at the UE 120a.

Additionally, in some cases, to further conserving power and processing resources, the UE may also power down one or more RF chains while performing the measurements on the one or more remaining SSBs. For example, in some cases, the UE 120a may determine at least one receive beam of the one or more receive beams used for performing the measurements on the one or more remaining SSBs has a previous power value measurement that below the threshold power value. Accordingly, in this case, instead of using power and processing resources to operate one or more RF chains associated with the at least one beam (e.g., that will likely again have a power value measurement below the threshold power value), the UE may decide to conserve power and processing resources by powering down (e.g., putting into a sleep mode) the one or more RF chains associated with the at least one receive beam while performing the measurements on the one or more remaining SSBs. Accordingly, after powering down the one or more RF chains associated with the at least one receive beam that has the previous power value measurement that below the threshold power value, the UE may use a remaining number of non-powered down RF chains of the UE to perform the measurements on the one or more remaining SSBs.

It should be noted that, while the techniques for a synchronization signal block (SSB)-level sleep mode are described herein in relation to 5G mmW communications, such techniques may equally apply to sub-six gigahertz wireless communications system. For example, the techniques described above for determining a first set of SSBs in an synchronization signal burst set to forego performing measurements may apply equally to a synchronization signal burst set associated with a sub-six gigahertz wireless communications system.

Figure 9:
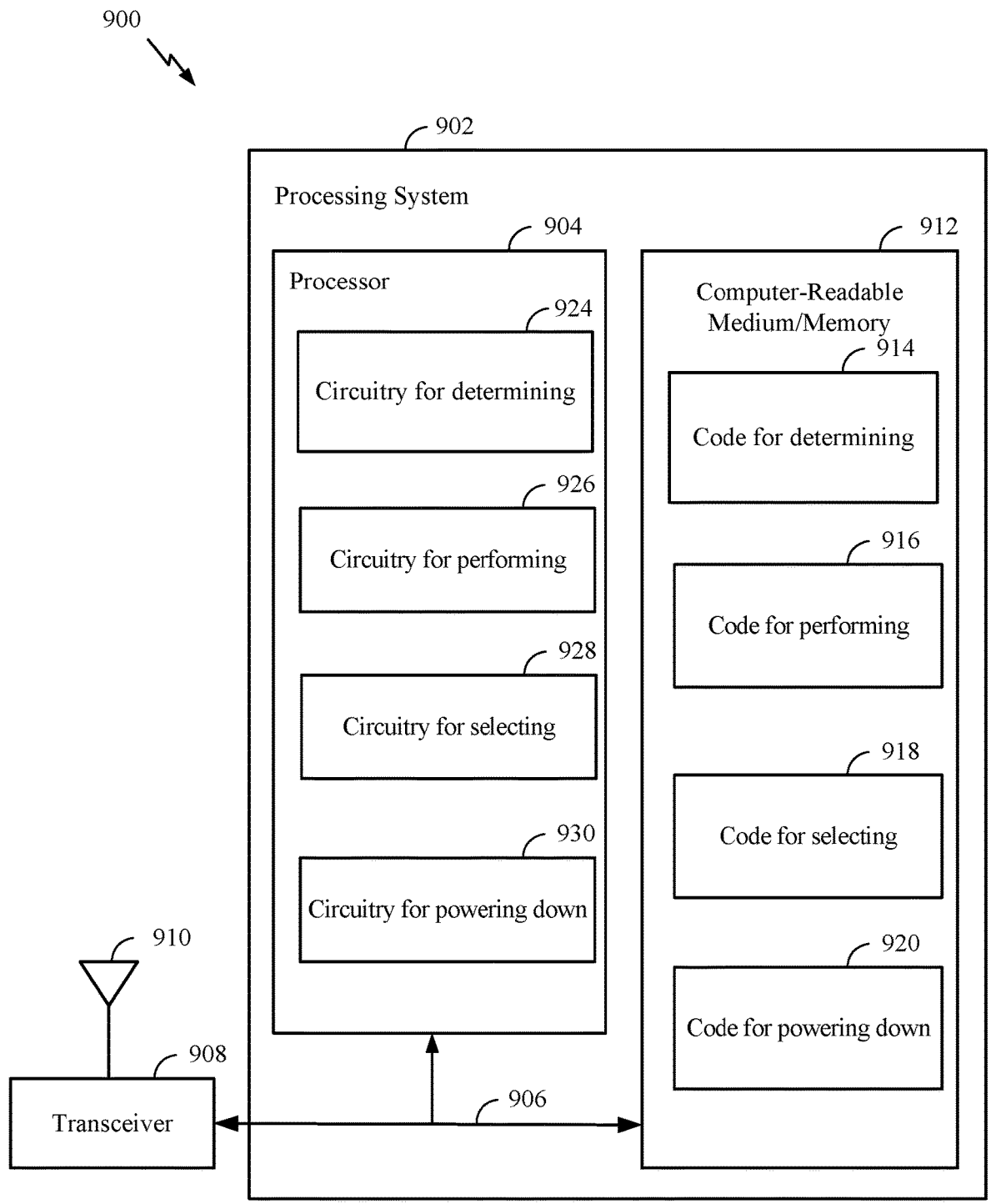
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for a synchronization signal block (SSB)-level sleep mode as described herein. In certain aspects, computer-readable medium/memory 912 stores code 914 for determining; code 916 for performing; code 918 for selecting; and code 920 for powering down.

In some cases, code 914 for determining may include code for determining, from a synchronization signal burst set, a first set of synchronization signal blocks (SSBs) to forgo performing measurements on using one or more receive beams based, at least in part, on one or more previous measurements associated with the determined first set of SSBs.

In some cases, code 916 for performing may include code for performing measurements on only one or more remaining SSBs in the synchronization signal burst set using the one or more receive beams.

In some cases, code 914 for determining may include code for determining, based on the one or more previous measurements, that each receive beam of the one or more receive beams used to perform the one or more previous measurements on the first set of SSBs has a power value measurement that is below a threshold power value.

In some cases, code 918 for selecting may include code for selecting the first set of SSBs based on each receive beam of the one or more receive beams used to perform the one or more previous measurements on the first set of SSBs having the power value measurement that is below the threshold power value.

In some cases, code 920 for powering down may include code for powering down a first set of radio frequency (RF) chains of the UE during transmission of the first set of SSBs by a base station.

In some cases, code 914 for determining may include code for determining at least one receive beam of the one or more receive beams used for performing the measurements on the one or more remaining SSBs has a previous power value measurement that below a threshold power value.

In some cases, code 920 for powering down may include code for powering down one or more radio frequency (RF) chains of the UE associated with the at least one receive beam while performing the measurements on the one or more remaining SSBs.

In some cases, code 916 for performing may include code for using a remaining number of non-powered down RF chains of the UE to perform the measurements on the one or more remaining SSBs.

In certain aspects, the processor 904 includes circuitry configured to implement the code stored in the computer-readable medium/memory 912. The processor 904 includes circuitry 924 for determining; circuitry 926 for performing; circuitry 928 for selecting; and circuitry 930 for powering down.

In some cases, circuitry 924 for determining may include circuitry for determining, from a synchronization signal burst set, a first set of synchronization signal blocks (SSBs) to forgo performing measurements on using one or more receive beams based, at least in part, on one or more previous measurements associated with the determined first set of SSBs.

In some cases, circuitry 926 for performing may include circuitry for performing measurements on only one or more remaining SSBs in the synchronization signal burst set using the one or more receive beams.

In some cases, circuitry 924 for determining may include circuitry for determining, based on the one or more previous measurements, that each receive beam of the one or more receive beams used to perform the one or more previous measurements on the first set of SSBs has a power value measurement that is below a threshold power value.

In some cases, circuitry 928 for selecting may include circuitry for selecting the first set of SSBs based on each receive beam of the one or more receive beams used to perform the one or more previous measurements on the first set of SSBs having the power value measurement that is below the threshold power value.

In some cases, circuitry 930 for powering down may include circuitry for powering down a first set of radio frequency (RF) chains of the UE during transmission of the first set of SSBs by a base station.

In some cases, circuitry 924 for determining may include circuitry for determining at least one receive beam of the one or more receive beams used for performing the measurements on the one or more remaining SSBs has a previous power value measurement that below a threshold power value.

In some cases, circuitry 930 for powering down may include circuitry for powering down one or more radio frequency (RF) chains of the UE associated with the at least one receive beam while performing the measurements on the one or more remaining SSBs.

In some cases, circuitry 926 for performing may include circuitry for using a remaining number of non-powered down RF chains of the UE to perform the measurements on the one or more remaining SSBs.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7, as well as other operations described herein for a synchronization signal block (SSB)-level sleep mode.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
    determining, by the UE and from a synchronization signal burst set, a first set of synchronization signal blocks (SSBs) to forgo performing measurements on using one or more receive beams based, at least in part, on one or more previous measurements associated with the determined first set of SSBs; and
    performing measurements on only one or more remaining SSBs in the synchronization signal burst set using the one or more receive beams.

2. The method of claim 1, wherein determining the first set of SSBs comprises:
    determining, based on the one or more previous measurements, that each receive beam of the one or more receive beams used to perform the one or more previous measurements on the first set of SSBs has a power value measurement that is below a threshold power value; and
    selecting the first set of SSBs based on each receive beam of the one or more receive beams used to perform the one or more previous measurements on the first set of SSBs having the power value measurement that is below the threshold power value.

3. The method of claim 2, wherein at least one receive beam of the one or more receive beams used for performing the measurements on the one or more remaining SSBs has a previous power value measurement that is equal to or above the threshold power value.

4. The method of claim 2, wherein the power threshold value is based on one or more channel statistics associated with the one or more receive beams.

5. The method of claim 4, wherein the one or more channel statistics comprise at least one of:
    whether the one or more receive beams are in line of sight (LOS);
    whether the one or more receive beams are in non-line of sight (NLOS); or
    rich scattering associated with the one or more receive beams.

6. The method of claim 2, wherein the power threshold value is based on at least one of a rotation speed of the UE or a Doppler measurement associated with the UE.

7. The method of claim 1, further comprising powering down a first set of radio frequency (RF) chains of the UE during transmission of the first set of SSBs by a base station.

8. The method of claim 1, further comprising determining at least one receive beam of the one or more receive beams used for performing the measurements on the one or more remaining SSBs has a previous power value measurement that below a threshold power value.

9. The method of claim 8, further comprising:
    powering down one or more radio frequency (RF) chains of the UE associated with the at least one receive beam while performing the measurements on the one or more remaining SSBs; and
    using a remaining number of non-powered down RF chains of the UE to perform the measurements on the one or more remaining SSBs.

10. The method of claim 1, wherein the one or more previous measurements are filtered based on one or more filtering parameters.

11. The method of claim 1, wherein the synchronization signal burst set is associated with a sub-six gigahertz wireless communications system.

12. An apparatus for wireless communication by a user equipment (UE), comprising:
    at least one processor configured to:
        determine, by the UE and from a synchronization signal burst set, a first set of synchronization signal blocks (SSBs) to forgo performing measurements on using one or more receive beams based, at least in part, on one or more previous measurements associated with the determined first set of SSBs; and
        perform measurements on only one or more remaining SSBs in the synchronization signal burst set using the one or more receive beams; and
    a memory coupled with the at least one processor.

13. The apparatus of claim 12, wherein the at least one processor is configured to determine the first set of SSBs by:
   determining, based on the one or more previous measurements, that each receive beam of the one or more receive beams used to perform the one or more previous measurements on the first set of SSBs has a power value measurement that is below a threshold power value; and
   selecting the first set of SSBs based on each receive beam of the one or more receive beams used to perform the one or more previous measurements on the first set of SSBs having the power value measurement that is below the threshold power value.

14. The apparatus of claim 13, wherein at least one receive beam of the one or more receive beams used for performing the measurements on the one or more remaining SSBs has a previous power value measurement that is equal to or above the threshold power value.

15. The apparatus of claim 13, wherein the power threshold value is based on one or more channel statistics associated with the one or more receive beams.

16. The apparatus of claim 15, wherein the one or more channel statistics comprise at least one of:
   whether the one or more receive beams are in line of sight (LOS);
   whether the one or more receive beams are in non-line of sight (NLOS); or
   rich scattering associated with the one or more receive beams.

17. The apparatus of claim 13, wherein the power threshold value is based on at least one of a rotation speed of the UE or a Doppler measurement associated with the UE.

18. The apparatus of claim 12, wherein the at least one processor is further configured to power down a first set of radio frequency (RF) chains of the UE during transmission of the first set of SSBs by a base station.

19. The apparatus of claim 12, wherein the at least one processor is further configured to determine at least one receive beam of the one or more receive beams used for performing the measurements on the one or more remaining SSBs has a previous power value measurement that below a threshold power value.

20. The apparatus of claim 19, wherein the at least one processor is further configured to:
   power down one or more radio frequency (RF) chains of the UE associated with the at least one receive beam while performing the measurements on the one or more remaining SSBs; and
   use a remaining number of non-powered down RF chains of the UE to perform the measurements on the one or more remaining SSBs.

21. The apparatus of claim 12, wherein the one or more previous measurements are filtered based on one or more filtering parameters.

22. The apparatus of claim 12, wherein the synchronization signal burst set is associated with a sub-six gigahertz wireless communications system.

23. An apparatus for wireless communication by a user equipment (UE), comprising:
   means for determining, by the UE and from a synchronization signal burst set, a first set of synchronization signal blocks (SSBs) to forgo performing measurements on using one or more receive beams based, at least in part, on one or more previous measurements associated with the determined first set of SSBs; and
   means for performing measurements on only one or more remaining SSBs in the synchronization signal burst set using the one or more receive beams.

24. The apparatus of claim 23, wherein the means for determining the first set of SSBs further comprise means for:
   determining, based on the one or more previous measurements, that each receive beam of the one or more receive beams used to perform the one or more previous measurements on the first set of SSBs has a power value measurement that is below a threshold power value; and
   selecting the first set of SSBs based on each receive beam of the one or more receive beams used to perform the one or more previous measurements on the first set of SSBs having the power value measurement that is below the threshold power value.

25. The apparatus of claim 23, further comprising means for powering down a first set of radio frequency (RF) chains of the UE during transmission of the first set of SSBs by a base station.

26. The apparatus of claim 23, further comprising:
   means for determining at least one receive beam of the one or more receive beams used for performing the measurements on the one or more remaining SSBs has a previous power value measurement that below a threshold power value;
   means for powering down one or more radio frequency (RF) chains of the UE associated with the at least one receive beam while performing the measurements on the one or more remaining SSBs; and
   means for using a remaining number of non-powered down RF chains of the UE to perform the measurements on the one or more remaining SSBs.

27. A non-transitory computer-readable medium for wireless communication by a user equipment (UE), comprising:
   instructions that, when executed by at least one processor, cause the at least one processor to:
      determine, by the UE and from a synchronization signal burst set, a first set of synchronization signal blocks (SSBs) to forgo performing measurements on using one or more receive beams based, at least in part, on one or more previous measurements associated with the determined first set of SSBs; and
      perform measurements on only one or more remaining SSBs in the synchronization signal burst set using the one or more receive beams.

28. The non-transitory computer-readable medium of claim 27, wherein the instructions that cause the at least one processor to determine the first set of SSBs further include instructions that cause the at least one processor to:
   determining, based on the one or more previous measurements, that each receive beam of the one or more receive beams used to perform the one or more previous measurements on the first set of SSBs has a power value measurement that is below a threshold power value; and
   selecting the first set of SSBs based on each receive beam of the one or more receive beams used to perform the one or more previous measurements on the first set of SSBs having the power value measurement that is below the threshold power value.

29. The non-transitory computer-readable medium of claim 27, further comprising instructions that cause the at least one processor to power down a first set of radio frequency (RF) chains of the UE during transmission of the first set of SSBs by a base station.

30. The non-transitory computer-readable medium of claim 27, further comprising instructions that cause the at least one processor to:
- determine at least one receive beam of the one or more receive beams used for performing the measurements on the one or more remaining SSBs has a previous power value measurement that below a threshold power value;
- power down one or more radio frequency (RF) chains of the UE associated with the at least one receive beam while performing the measurements on the one or more remaining SSBs; and
- use a remaining number of non-powered down RF chains of the UE to perform the measurements on the one or more remaining SSBs.

\* \* \* \* \*